F. A. DOYLE.
PROCESS OF FORMING BAKERS' MIX.
APPLICATION FILED JULY 20, 1920.
1,387,693.
Patented Aug. 16, 1921.
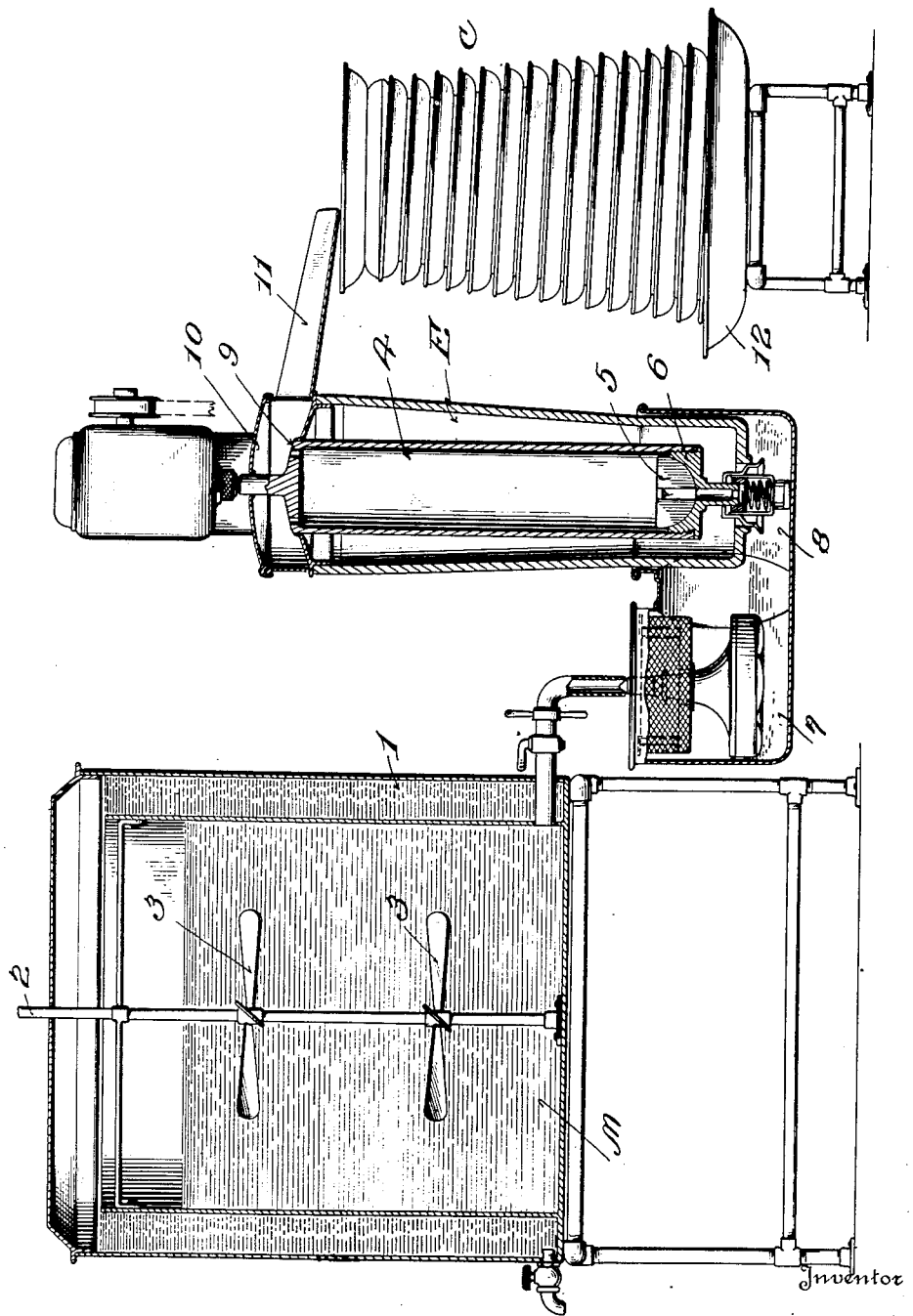

UNITED STATES PATENT OFFICE.

FRANK ANTONE DOYLE, OF WEST CHESTER, PENNSYLVANIA, ASSIGNOR TO THE SHARPLES SEPARATOR CO., OF WEST CHESTER, PENNSYLVANIA, A CORPORATION OF PENNSYLVANIA.

PROCESS OF FORMING BAKERS' MIX.

1,387,693.  Specification of Letters Patent.  Patented Aug. 16, 1921.

Application filed July 20, 1920. Serial No. 397,651.

*To all whom it may concern:*

Be it known that I, FRANK ANTONE DOYLE, a citizen of the United States, residing at West Chester, in the county of Chester, State of Pennsylvania, have invented certain new and useful Improvements in Processes of Forming Bakers' Mix, of which the following is a description, reference being had to the accompanying drawing and to the figures of reference marked thereon.

The invention relates to new and useful improvements in a process of forming a baker's mix, that is, bringing together the basic ingredients, except the flour and yeast, essential to the making of leaven bread.

An object of the invention is to bring into a homogeneous liquid mass ingredients of a baker's mix, that is, a shortening fat and a wetting and preferably a sweetening and salt.

A further object of the invention is to thoroughly emulsify the mixed ingredients so as to divide the shortening fat into relatively small particles.

A still further object of the invention is to clarify the mixed ingredients by removing therefrom any undissolved minerals present in the salt, dirt, and other solid foreign matters.

Another object of the invention is to bring the ingredients—shortening, wetting, sweetening and salt, to an emulsified and homogeneous liquid mass, so that it can be flowed over a cooler and chilled to any desired temperature. This permits temperature control, which is an advantage in mixing these ingredients with the flour.

These and other objects will in part be obvious and will in part be hereinafter more fully described.

In the drawings, the figure shows more or less diagrammatically and in vertical section one form of apparatus which may be utilized in carrying out the invention.

The invention is directed broadly to a process of making a baker's mix which consists of a shortening fat, such as lard or oils, and a weting, such as water or milk or condensed milk and water, to which is added preferably, a sweetening, such as sugar or molasses or syrup, and salt. The purpose of my process is to bring together the ingredients of a baker's mix, in such a way as to produce a homogeneous liquid mass wherein the fat particles are finely divided and thoroughly mixed with the wetting. A further purpose of the invention is to thoroughly clarify the mixture by removing therefrom any undissolved minerals present in the salt or dirt or other solid foreign matter.

The objects of the invention are obtained by mixing the ingredients in a suitable tank, and during mixing the ingredients are heated to a temperature sufficient to melt the fat and dissolve the sugar and salt. The mixed liquid ingredients are then passed through an emulsifier, preferably of the vertical, cylindrical, revolving bowl type. The ingredients are impacted against the vertical wall of the revolving bowl where they are thoroughly emulsified and the fat particles finely divided. The emulsified, mixed ingredients, through the action of centrifugal force thereon, pass upwardly along the vertical wall and escape from the top of the revolving bowl in a fine mist or fog, are collected and then pass through a cooler where they are chilled. As these ingredients pass along the vertical wall of the revolving bowl of the emulsifier, centrifugal force will cause the hard, undissolved mineral substances present in the liquid and any other solid foreign matter to adhere to the wall of the emulsifier so that the mixed liquid escaping from the emulsifier bowl is thoroughly clarified. It is possible that the invention will be better understood by a brief reference to the apparatus shown in the drawings, which *per se* forms no part of the present invention but which is the preferred form of apparatus for practising the invention.

In the drawings, I have shown a mixing tank M which is provided with spaced walls forming a heating chamber 1 in which hot water or the like may be caused to circulate. Within the tank is a rotating shaft 2 carrying blades 3 which rotate in the mixture and thoroughly mix the ingredients, thus aiding in the quick dissolving of the fat and the sweetening. In forming a baker's mix, I put in the mixing tank M the desired amount of shortening fat, that is, lard or oils which may be used for shortening fat, wetting, which may be water or milk or condensed milk and water, a sweetening, which may be sugar, molasses or syrup, and salt. The temperature of the water is preferably regulated so as to heat the mixture in the tank to about 110°. This will quickly cause the solid fats and the sweetening to dissolve.

The emulsifier is indicated at E and consists of a relatively long cylindrical revolving bowl 4 which is preferably supported in a bearing at its upper end and is revolved by suitable means at a speed of from twelve thousand to sixteen thousand revolutions per minute. At the bottom of the bowl there is a separator 5 and radial blades or wings 6. The material, which is thoroughly dissolved in the mixer M, is caused to flow into a receptacle 7 and from the receptacle 7 into the receptacle 8. In the receptacle 7 there is a float controlled valve which regulates the amount of liquid mixture in the receptacle E. The rotating of the bowl 4 creates a suction which causes the material to flow from the receptacle 8 up into the lower part of the bowl where it is separated by the separator 5 and divided by the radial blades or wings 6 so that the material is thrown against the vertical wall of the revolving bowl.

In effect a globule of material is thrown against the wall, then another globule is thrown against the one preceding, and thus the material is not only impacted upon the wall but upon itself which brings about a thorough emulsification of the mixture. This results in producing a homogeneous liquid mass wherein the fat particles are very finely divided and thoroughly mixed with the liquids. Through the action of centrifugal force, the material creeps up along the vertical wall of the bowl and is discharged through the openings 9. Said emulsified mixture will pass out through the openings in the form of a fine mist or fog and will be collected by the cover portion 10 of the emulsifier and directed into the spout 11 from which it is delivered onto the cooler C. Said cooler C consists of a series of pipes through which cooling brine may be passed and the liquid mass runs down from the outer surface of the pipes into the collecting receptacle 12 at the bottom of the cooler.

As the emulsified liquid mass passes upwardly along the vertical wall of the bowl 4, the solid parts in the liquid mass, such as any undissolved minerals present in the salt, dirt or any other solid foreign matter will be caused to adhere to the vertical wall of the bowl through the action of centrifugal force which is at right angles to the surface of the bowl. The liquid, however, will creep up the bowl and be discharged, and thus the liquid mass is thoroughly clarified. This greatly increases the quality and whiteness of the bread as all the objectionable foreign solid particles are removed from the mix.

The breaking up of the fat particles and the thorough distribution thereof throughout the liquid mass will cause said shortening fat to have a greater efficiency, give to the dough a greater elasticity, permitting greater expansion without rupturing the dough, and thus greatly increasing the efficiency of the yeast. In other words, by the same amount of shortening fat a better bread can be made or equally as good bread can be made with a much less quantity of shortening fat. Then again, where the ingredients are thoroughly emulsified and brought into a homogeneous liquid mass, the flour may be incorporated therein in a much shorter time than has been heretofore possible where the shortening fats and wetting are all placed in the bread mixer with the flour. Furthermore, by the chilling of the liquid mass as it comes from the emulsifier it may be at once used in the bread mixer, and the temperature may be controlled so as to bring about an efficient operation of the bread mixer and a thorough incorporation of the flour in the liquid mass in a relatively short interval of time.

It is obvious that minor changes in the steps of the entire method described may be varied, and that one of the essential features is in the emulsifying of the baker's mix and is not limited to the specific ingredients which are used to form the baker's mix. Another essential feature of the invention consists in the clarifying of the baker's mix although this step in the process from certain aspects of the invention may be omitted. In other words, the emulsification may be brought about in an emulsifier wherein the tubular bowl is very short so that the emulsified liquid is permitted to escape almost directly after coming in contact with the revolving vertical wall of the bowl.

Having thus described the invention, what is claimed as new is:—

1. The process of forming a baker's mix consisting of mixing a shortening fat and a wetting and emulsifying the mixture whereby the shortening fat is divided into relatively small particles and a thoroughly homogeneous liquid mass produced.

2. The process of forming a baker's mix consisting in mixing a shortening fat and a wetting, heating the mixture to dissolve the fat and emulsifying the mixed liquid mass, whereby the shortening fat is divided into relatively small particles and a thoroughly homogeneous liquid mass produced.

3. The process of forming a baker's mix consisting in mixing a shortening fat and a wetting, heating the mixture to dissolve the fat and emulsifying the mixed liquid mass, whereby the shortening fat is divided into relatively small particles and a thoroughly homogeneous liquid mass produced, and chilling the emulsified liquid mass.

4. The process of forming a baker's mix consisting in mixing a shortening fat, a wetting, a sweetening and salt, heating the mixture to dissolve the fat, sweetening and salt, emulsifying the mixed liquid mass while heated, whereby the shortening fat is divided into relatively small particles and a thoroughly homogeneous liquid mass produced, clarifying the emulsified liquid mass by separating therefrom any remaining solid particles therein, and chilling the emulsified clarified liquid mass.

In testimony whereof, I affix my signature.

FRANK ANTONE DOYLE.